(12) United States Patent
Jacovetty et al.

(10) Patent No.: US 8,115,138 B2
(45) Date of Patent: Feb. 14, 2012

(54) COMPREHENSIVE IDENTIFICATION AND DESIGNATION OF WELDING PROCEDURES

(75) Inventors: Ronald Robert Jacovetty, Solon, OH (US); Dmitry Brant, Richmond Heights, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 1101 days.

(21) Appl. No.: 11/143,208

(22) Filed: Jun. 2, 2005

(65) Prior Publication Data

US 2006/0207980 A1 Sep. 21, 2006

Related U.S. Application Data

(60) Provisional application No. 60/662,013, filed on Mar. 15, 2005.

(51) Int. Cl.
 *B23K 9/10* (2006.01)
 *G06F 19/00* (2006.01)

(52) U.S. Cl. ............. 219/130.5; 219/132; 700/212

(58) Field of Classification Search ............ 219/132, 219/136, 130.5; 700/169, 212
 See application file for complete search history.

(56) References Cited

U.S. PATENT DOCUMENTS

| | | | | |
|---|---|---|---|---|
| 4,717,805 A * | 1/1988 | Miyagawa | | 219/108 |
| 4,815,014 A * | 3/1989 | Lipner et al. | | 702/184 |
| 4,881,678 A | 11/1989 | Gaudin | | |
| 5,714,733 A * | 2/1998 | Moro | | 219/121.61 |
| 6,004,276 A * | 12/1999 | Wright et al. | | 600/508 |
| 7,123,990 B2 * | 10/2006 | Thelen | | 700/245 |
| 7,289,862 B2 * | 10/2007 | Britton | | 700/110 |
| 2001/0025836 A1 * | 10/2001 | Shimogama | | 219/125.1 |
| 2002/0077739 A1 * | 6/2002 | Augsburger et al. | | 701/115 |
| 2002/0082928 A1 * | 6/2002 | Kodama et al. | | 705/22 |
| 2003/0023333 A1 * | 1/2003 | Birkle | | 700/96 |
| 2003/0033052 A1 * | 2/2003 | Hillen et al. | | 700/212 |
| 2003/0062351 A1 * | 4/2003 | Davidson et al. | | 219/130.5 |
| 2004/0015258 A1 * | 1/2004 | Hayes | | 700/145 |
| 2004/0050827 A1 * | 3/2004 | Aktas | | 219/117.1 |
| 2004/0122550 A1 * | 6/2004 | Klimko et al. | | 700/212 |
| 2004/0232128 A1 | 11/2004 | Niedereder et al. | | |
| 2004/0262279 A1 | 12/2004 | Spear et al. | | |
| 2005/0071042 A1 * | 3/2005 | Subrahmanyam et al. | ... | 700/212 |
| 2005/0125084 A1 * | 6/2005 | Harvey et al. | | 700/52 |
| 2005/0149210 A1 * | 7/2005 | Britton | | 700/51 |

(Continued)

FOREIGN PATENT DOCUMENTS

CN 1525896 A 9/2004

(Continued)

OTHER PUBLICATIONS

European Search Report dated Aug. 14, 2006 for European Patent Application Serial No. EP06004847, 7 Pages.

(Continued)

*Primary Examiner* — Geoffrey S Evans

(74) *Attorney, Agent, or Firm* — Turocy & Watson, LLP

(57) ABSTRACT

System(s) and method(s) that facilitates comprehensive identification and designation of welding procedures. A configuration component facilitates configuring the welding system with respect to pre-defined procedures and/or parameters and facilitates naming of the configured welding system. A storage component that stores the configured welding system in a readily accessible memory location. A remote access component can facilitate remotely accessing the welding system, the configuration of the welding system alterable by way of the remote access component.

14 Claims, 12 Drawing Sheets

U.S. PATENT DOCUMENTS

2006/0178778 A1* 8/2006 Fuhlbrigge et al. .......... 700/264

FOREIGN PATENT DOCUMENTS

CN 1553839 A 12/2004
EP 903195 A1 * 3/1999

OTHER PUBLICATIONS

"Bedienungshandbuch MSG-Puls-Arc-Schweissanlage SAPROM C5/C8" 1998.
AUOA dated Feb. 18, 2008 for Australian Patent Application No. 2006201064, 3 pages.
CNOA dispatched Sep. 12, 2008 for Chinese Patent Application No. 200610071424.2, 12 pages.
CNOA dispatched Mar. 6, 2009 for Chinese Patent Application No. 200610071424.2, 8 pages.
Notarized Certification of Translation for 'Bedienungshandbuch MSG-Plus-Arc-Schweissanlage SAPROM C5/C8' by Trusted Translation, Inc., Jun. 24, 2009, 1 page.
Certified English Translation of Sections 5.2, 8.18, 12.1, 12.2, 12.3, 12.4 including 12.4.1, and 12.5 from 'Bedienungshandbuch MSG-Plus-Arc-Schweissanlage SAPROM C5/C8'. Last accessed Jun. 24, 2009, 6 pages.
CN OA Dated Jul. 24, 2009 for Chinese Patent Application No. 200610071424.2, 4 pages.
CA OA Dated Jul. 16, 2009 for Canadian Patent Application No. 2538835, 3 pages.
EP OA Dated Nov. 28, 2006 for European Patent Application No. 06004847.7, 1 page.
CNOA Due Nov. 8, 2009 for Chinese Patent Application No. 200610071424.2, 17 pages.
Notice on Reexamination dated Jun. 23, 2010 for Chinese Patent Application No. 200610071424.2, 5 pages.
Notice on Reexamination dated Sep. 16, 2010 for Chinese Patent Application No. 200610071424.2, 11 pages.
Chinese OA for Chinese Application No. 200610071424.2, mailing date Jan. 12, 2011, p. 1.

* cited by examiner

COMPREHENSIVE IDENTIFICATION AND DESIGNATION OF WELDING PROCEDURES

CROSS-REFERENCE TO RELATED APPLICATIONS

This application claims the benefit under 35 U.S.C. §119 (e) of U.S. Provisional Application Ser. No. 60/662,013, filed Mar. 15, 2005, and entitled "COMPREHENSIVE IDENTIFICATION AND DESIGNATION OF WELDING PROCEDURES," the entirety of which is incorporated herein by reference.

TECHNICAL FIELD

The invention relates generally to computer and welding systems. More particularly the invention relates to a system and method of comprehensive identification and designation of welding procedures.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of a construction process, wherein sophisticated controllers enable individual welders to operate within relevant portions of the process.

For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger construction environments and many times are spread across multiple locations. Given the nature and necessities of modern and more complex operations however, welding systems designers, architects, and suppliers face increasing challenges about upgrading, maintaining, controlling, servicing, and supplying various welding locations.

Modern high-end welding systems often feature one or more user interface panels that provide operator(s) the ability to change the welding mode and/or procedure, manipulate output parameters, save, and/or recall previous parameters in a plurality of memory "slots." Each memory slot contains the selected welding procedure, any associated parameters, and/or limit settings needed for welding with the given procedure. When a certain memory slot is recalled, the name of the procedure, as assigned by the manufacturer, and its associated parameters are shown on the user interface display(s).

While each welding procedure has its own name per se (e.g., "PulseSoft," "CV," "RapidArc") as assigned by the manufacturer, it is often desirable for the end user to assign a unique name to each procedure and subset of procedures that is more descriptive and meaningful for each individual operator and/or welding system user. Accordingly, there exists a need in the art for systems and/or methodologies that facilitate comprehensive identification and designation of welding procedures.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The invention relates to system(s) and method(s) for comprehensive identification and designation of welding procedures. An aspect of the invention allows a user to assign an arbitrary name to a welding mode and/or subset of welding modes, for example, by utilizing memory slots, through the use of an external interactive configuration tool, or via the user interface. The user can describe the welding procedure with more relevance to the associated task. For example, the user can assign a name to each memory slot allowing the user to readily perceive and verify the part that is to be welded. This name assignment can be performed using suitable communication systems such as, for example, a personal computer connected to the welding system, a PDA (Palm) application through a similar connection to the welding system (or an infrared channel) through wireless technology, through the user interface panel, or any suitable communication means.

According to an aspect of the invention is a system that facilitates selection and naming of procedures in a welding system. The system includes a user interface component that allows a user to select a subset of welding procedures from a plurality of welding procedures and generates an output of the selected subset of welding procedures. Also included is a modification component that receives the output from the user interface and updates a display of the welding system with a user-defined name. An information gathering component facilitates configuration of the welding system through an interactive configuration tool that provides user-prompts to assist the user to configure the welding system. The interactive configuration tool can further facilitate defining user settings to maintain quality of the welding system. The system can further include a storage component that stores the configured welding procedures and permits access to the stored configured welding procedures. A remote access component can be included that facilitates configuration of the welding system at a remote location.

According to another aspect of the invention is a method for identifying designated welding parameter. The method includes receiving at least one weld parameter, assigning a name to the at least one weld parameter, determining a memory location for the at least one weld parameter and name, and associating the received at least one weld parameter and name with a memory location. Receiving at least one weld parameter can further include receiving a value associated with the at least one weld parameter. According to another aspect the method can further include receiving a high limit and a low limit value associated with the at least one weld parameter.

DESCRIPTION OF THE INVENTION

Figure 1:
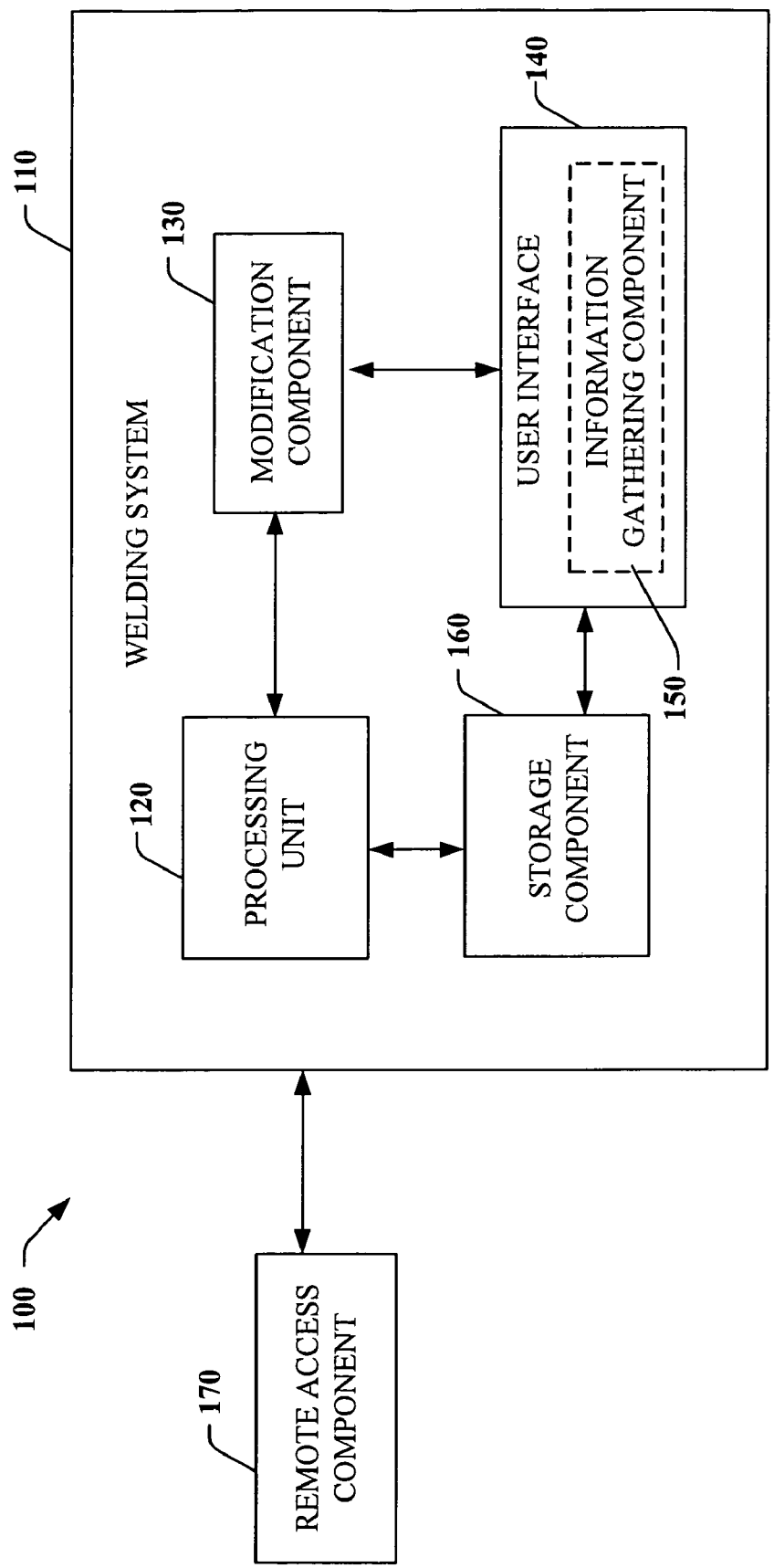
FIG. 1 illustrates a system for comprehensive identification and designation of welding procedure(s) in accordance with an aspect of the invention.

The subject invention is now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A "welder" or "welding unit" refers to physical hardware for producing a weld such as a wire feeder, contact tip, dresser, gas mixer, gas sneezer, gas controller, clamp actuator, travel carriage/part manipulator, robot arm/beam/torch manipulator, laser seam tracker, other input/output devices and welding power source along with any controller(s), monitor(s), and communications interface(s) associated with the physical hardware. For example, a welder can be used to perform gas metal arc welding (GMAW), flux cored arc welding, metal cored arc welding, submerged arc welding (SAW), narrow groove welding, gas tungsten arc welding (GTAW), plasma arc welding, electron beam and laser welding, hard surfacing welding, arc gouging and manual shielded arc welding (SMAW).

"Welding process" refers to a step or steps involved in a joining process and can include consumables to be used in the process along with settings for various aspects of a welding system before, during, and/or after the joining process. For example, some of these aspects relate to control of power and waveforms supplied to an electrode, movements or travel of a welding tip during welding, electrode travel to other welding points, gas control to protect a molten weld pool from oxidation at elevated temperatures and provide ionized plasma for an arc, and other aspects such as arc stability to control quality of the weld.

FIG. 1 illustrates a system 100 that facilitates comprehensive identification and designation of a welding procedure(s) in a welding system 110 in accordance with an aspect of the invention. The welding system 110 includes a processing unit 120 that is utilized to monitor a welding process and control such welding process. The processing unit 120 communicates with at least a portion of devices associated therewith by way of a local bus. In general, buses are employed to transfer data or power between computer components and/or other electronic devices. Buses typically can logically connect several devices over a same set of wires. By way of illustration, the local bus can utilize any suitable bus architecture, such as Control Area Network (CAN), an Ethernet architecture, Industrial Standard Architecture (ISA), Micro-Channel Architecture (MSA), Extended ISA (EISA), Intelligent Drive Electronics (IDE), VESA Local Bus (VLB), and the like.

The system 100 includes a modification component 130 coupled to the processing unit 120 and a user interface component 140. The modification component 130 is adapted to receive a user configurable input relating to a welding mode and/or process. For example, though an external interactive configuration tool, or the user interface 140, the user can select a subset of pre-defined procedures and/or parameters associated with the welding system 110. The pre-defined procedures and/or parameters can be those preset by the manufacturer and which generally have a predetermined naming convention. For example, there are dozens, if not hundreds, of different weld modes associated with a weld system and/or machine. Additionally, custom weld sets, which are different from standard parameters, are available. A user interface 140 and/or an interactive configuration tool provides the user a way to select a subset of the weld sets and additionally, provides parameters, such as values and/or limits associated with each selected procedure. The user can associate a unique or arbitrary name to the selected subset of procedures and/or parameters.

The user interface component 140 is adapted to communicate the selected subset of welding procedures, parameters and/or the user-defined name to the modification component 130. The modification component 130 is adapted to receive information concerning the selected subset of procedures and corresponding defined name as well as current welding parameters of the welding system 110, changes to the welding procedures and/or parameters as well as other information relating to a welding system 110. The processing unit 120 and/or modification component 130 is adapted to receive the current processing information from the modification component 130 and infer a user-state based upon the received information.

The user interface component 140 can include an information-gathering component 150 that is adapted to analyze a current setup of the welding system 110 and determine or infer information that needs to be obtained in order to configure such welding system 110. Thus, for instance, the information-gathering component 150 can query an operator with respect to procedure(s), welding unit associated with the selected procedure(s), projected application of a welding unit, system, and/or any other suitable data that can be utilized in connection with configuring the welding system 110.

Included in the welding system 110 can be a storage component 160 adapted to receive and retain the designated welding procedures and/or parameters and an associated naming convention. The storage component 160 can be memory and/or some other medium that can store information. By way of illustration, and not limitation, the storage component 160 can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

In accordance with another aspect of the subject invention, a remote access component 170 can enable a remote user to review and/or modify one or more configurations of the welding system 110. This provides a user the ability to monitor a welding process from a remote location, and make modifications to such processes and enables optimal process monitoring. The remote access component 170 provides such remote monitoring, and can enable data communication over any suitable network. For example, the remote access component 170 can enable a computer to access the modification component 130 over the Internet or an intranet. Thus, an operator can log onto a computing device, and by way of the remote access component 170 review set-up procedures resident upon the local bus as well as information relating to such procedures. For example, an operator can modify and/or add procedures and/or parameters from a remote location and automatically or manually apply that amended, modified, added, deleted, etc. procedure to the welding system 110. The operator can relay instructions by way of the remote access component 170 to configure the welding system 110 and/or utilize procedures and/or parameters in connection with the aforementioned welding process. The system(s) and method (s) described herein may be performed on the remote access component 170 and communicated to the welding system 110.

Figure 2:
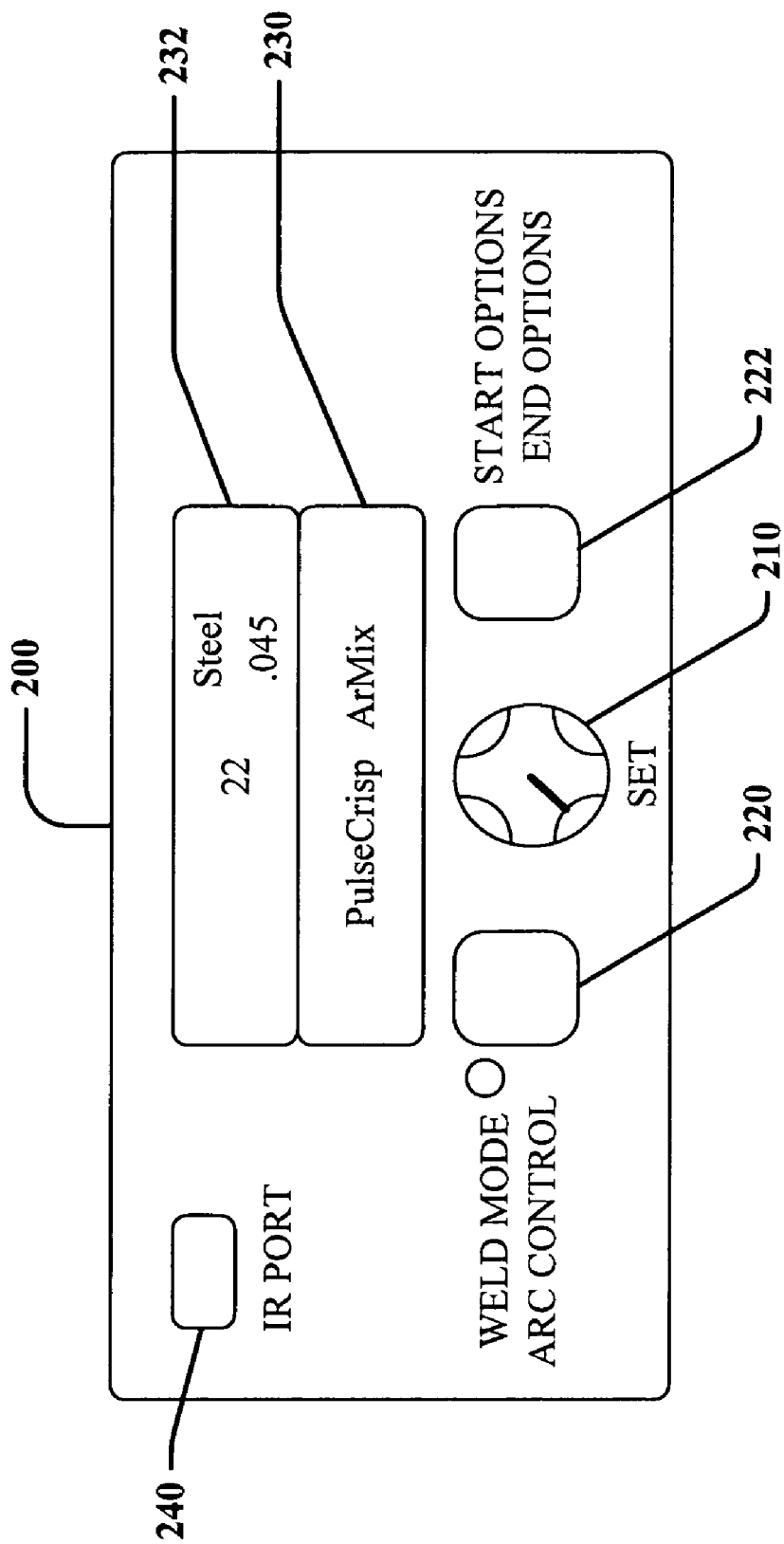
FIG. 2 illustrates an exemplary user interface panel in accordance with an aspect of the invention.

Referring now to FIG. 2, illustrated is an exemplary user interface panel 200 for a welding system. Welding systems may have one or more user interface panel(s) depending on the system capabilities and may include additional features or fewer features than those illustrated. It is understood that all such variations fall within the scope of this invention. The user interface panel 200 may include selector knob(s) 210 that allows the user to set or dial-in operating parameter(s). Also included can be pushbuttons 220 and 222, which provide control features of the welding system through a user interface and/or interactive user configuration tool. For example, a first pushbutton 220 can control a "weld mode" and/or "arc control" allowing the user to select and/or deselect the option with the pushbutton 220. A second pushbutton 222 can control "start options" and/or "end options." Other user interface options may be provided, such as a timer control (not shown). While only two pushbuttons and one selector knob are shown, it is to be understood that any number of pushbuttons and/or selector knobs can be utilized in accordance with the invention.

Included on the user interface panel 200 are user interface display(s) 230 and 232 which may be LCD display, plasma, touch screen, or any other display technology, and which provide the operator the ability to select welding parameters/procedures. This provides the operator a visual reference display of the specific welding parameters and/or procedures for which the welding system is currently configured. It is to be understood that while two displays are shown a weld system may have one or more displays and any such alterations fall within the scope of the invention.

Welding systems are generally provided by the manufacturer with pre-set welding procedures and naming conventions. For example, the manufacturer may title a procedure for constant voltage as "CV." When an operator selects a certain procedure, the default description name, as named by the manufacturer, is displayed in a user interface display 230. Illustrated is the selected procedure "PulseCrisp ArMix." Other criteria relating to the selected procedure may be displayed in the same, or additional user interface display(s) 232.

While the default naming convention "PulseCrisp ArMix" has significance to the manufacturer, it may not provide the desired level of specificity desired by an operator. Many welding system users/operators have formal weld procedures and their own naming conventions. Operators, supervisors, and others desire to the capability to readily determine if the welding procedure used is the correct one, or to quickly determine exactly what the operator is working on at any given time. The naming convention, as provided by the manufacturer does not enable this quick reference capability, because the manufacturer's associated name may not have significance to the user/operator. Providing the ability to change and/or store a user specified naming convention associated with a user-designated subset of welding parameters enables such name to be displayed on the user interface display 230 and/or 232 provides the operator with valuable operating data.

Figure 3:
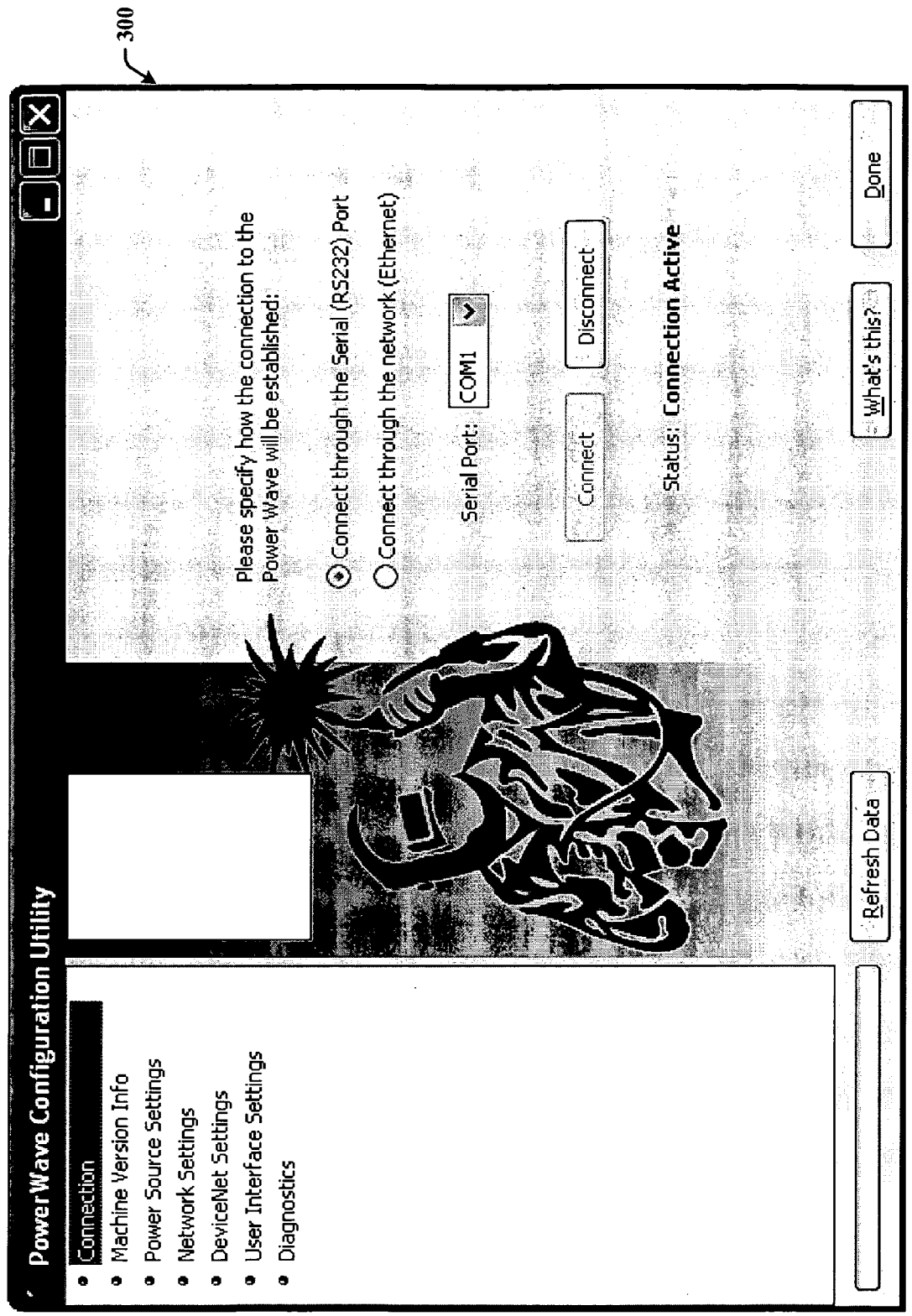
FIG. 3 illustrates an exemplary screen shot of a representative module of a configuration component according to an aspect of the invention.

FIG. 3 illustrates an exemplary screen shot of a representative user selectable component of an interactive configuration tool 300. The interactive configuration tool allows a user to select specific welding procedures and/or parameters and provide each subset of selections a designated naming convention in connection with the user interface 140. The interactive configuration tool can be used with any type of user interface and can be a graphical user interface (GUI), a command line interface, and the like. For example, a GUI can be rendered that provides a user with a region or means to load, import, read, etc. the one or more procedures from a processing unit and/or external components, and can include a region to present the results of such. These regions can comprise known text and/or graphic regions comprising dialogue boxes, static controls, drop-down menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with a processing unit 120, modification component 130, user interface 140, information gathering component 150, and/or storage component 160 via entering information into an interactive configuration tool.

The user can interact with the interactive configuration tool to select and provide information via various devices such as a mouse, a roller ball, a keypad, a keyboard, a pen and/or voice activation, for example. Typically, a mechanism such as a push button or the enter key on the keyboard can be employed subsequent entering the information to initiate a search. However, it is to be appreciated that the invention is not so limited. For example, merely highlighting a check box can initiate information conveyance. In another example, a command line interface can be employed. For example, the command line interface can prompt (e.g. via a text message on a display and an audio tone) the user for information via providing a text message. The user can provide suitable information, such as alpha-numeric input corresponding to an option provided in the interface prompt and/or an answer to a question posed in the prompt. The command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Referring also to FIG. 1, according to an aspect of the invention a remote access component 170 allows the external interactive configuration tool connection to the welding system 110. By way of example and not limitation, the connection may be established through a serial port, such as RS232, or through a network. For example, the interface component 120 can be adapted for wireless communication with a local system (e.g., Programmable Logic Device (PLD), Field-Programmable Gate Array (FPGA) and/or microprocessor based computer). The welding system can be connected to a customer specific local area network (LAN), for example, Ethernet, thus serving as a gateway for wireless communication between the customer specific LAN and the interactive configuration tool. Further, the components illustrated in FIG. 1 can be elements of a communications network of a welding cell communicating via a communications link, a LAN for example, utilizing a communications protocol. Thus, wireless communication between a welding cell and a customer specific LAN is facilitated. Further, configuration components of a plurality of welding cells can be adapted for wireless communication with a local server and/or a customer specific global factory controller. In accordance with the invention, modification components of a welding cell can be adapted for wireless communication among themselves thus establishing a wireless local area network. The modification components can communicate via a communications protocol.

With continuing reference to FIG. 3, the interactive configuration tool 300, provides the user to establish a connection between the interactive configuration tool and the welding system, for example through a serial (RS232) Port, a network (Ethernet), and the like. The user may access data, for example machine version information, regarding each welding system through utilization of user prompts. It is appreciated that a batch of welders can be given the same naming convention and procedures in a similar fashion.

Prompts provided by the interactive configuration tool 300 allow the user to select a subset of settings/procedures from the procedures established by the manufacturer, either standard or custom procedures. The settings include, but are not limited to, power source settings, network setting, DeviceNet settings, and/or user interface settings. Welding system diagnostics can be provided that monitor, record, and/or infer the health of a welding system.

Figure 4:
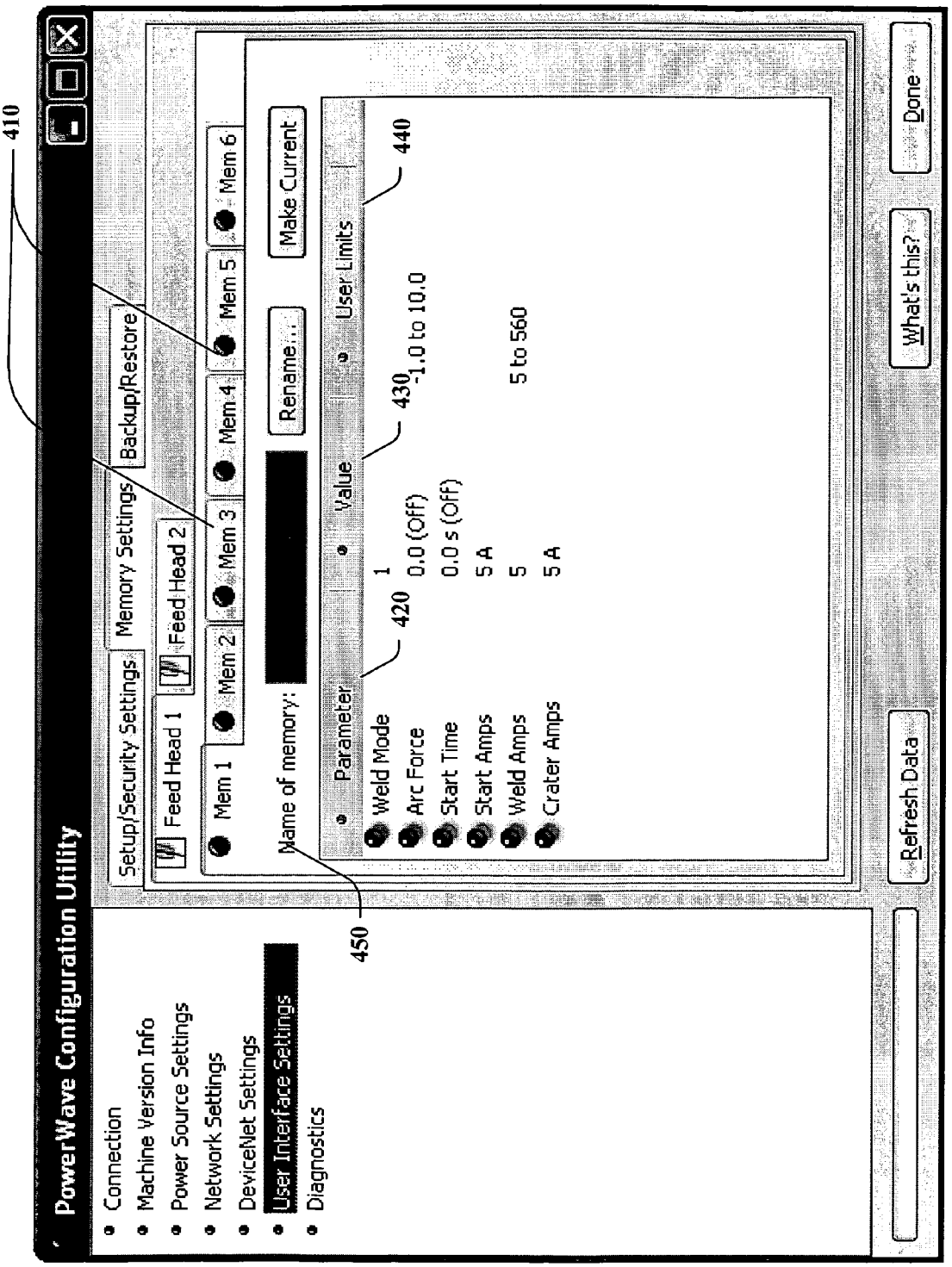
FIG. 4 illustrates an exemplary screen shot of a representative user module of a configuration component according to an aspect of the invention.

Referring now to FIG. 4, illustrated is a screen shot of exemplary user interface settings in accordance with an aspect of the invention. The user can configure specific procedures/settings and store these selections in memory, such as memory tabs or slots 1-6, of which a representative few are depicted at 410. While six memory cells are shown, it is appreciated that less or more than six memory cells may be utilized and fall within the scope of the invention. The user can select various parameters 420, such as "weld mode," "arc force," "start time," "start amps," "weld amps," "crater amps" and the like. Also provided can be user configurable set points, such as value(s) 430 and/or user limit(s) 440 for respective parameter(s) 420. By way of illustration and not limitation, the user can store limits, etc. to ensure that the operator welds at a certain wire feed speed. Thus, the pre-selected limits ensure that the operator is not going too fast or too slow, and is making a suitable weld. It will be understood by those skilled in the art that any user adjustable parameter such as arc current, arc voltage, arc power, etc. can be configured according to the systems and methods disclosed herein. Thus, the present invention provides quality control through use of the interactive configuration tool 300.

Figure 5:
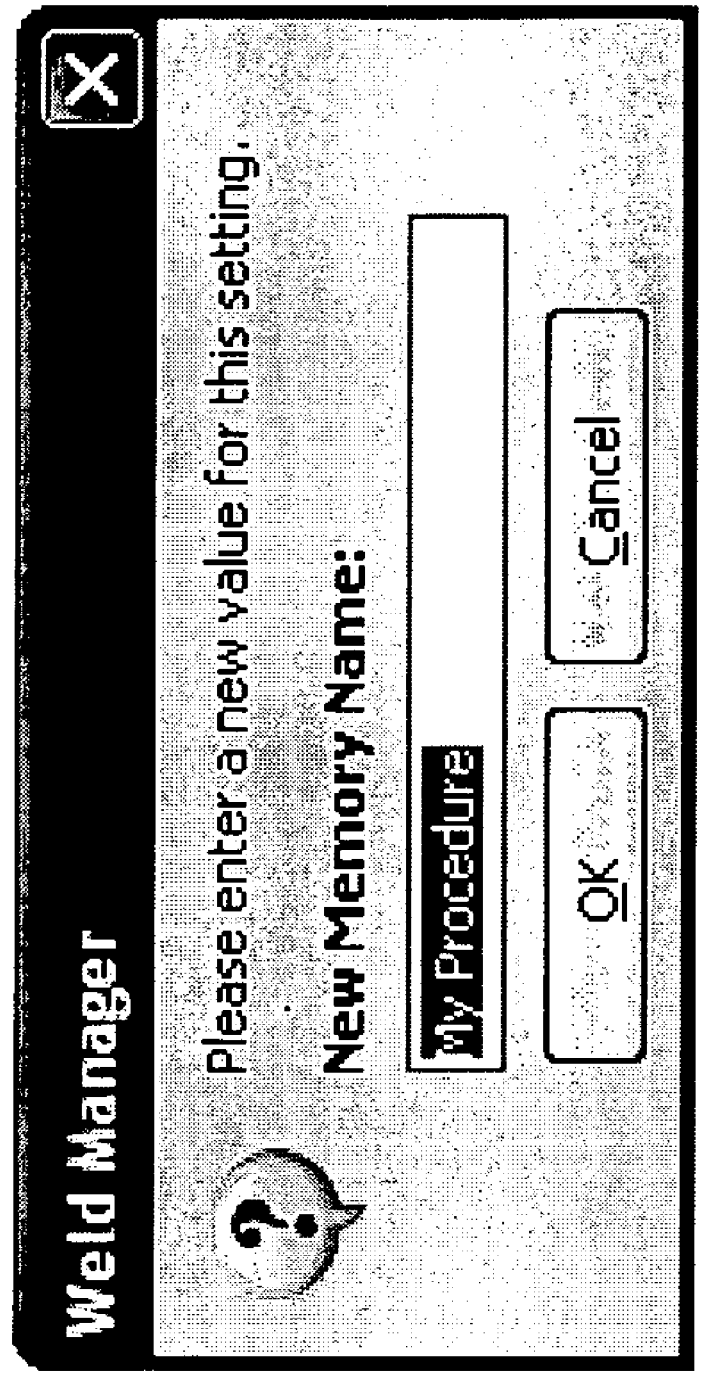
FIG. 5 illustrates an exemplary screen shot of a representative user module of a configuration component according to an aspect of the invention.

The user can designate a specific naming convention 450 for the configured procedure/parameters and associated memory slot(s) 410. FIG. 5 illustrates a screen shot of a prompt 500 that allows the user to designate a procedure name and/or memory name to the selected procedure/parameters. Once the configured procedure/parameters are named, the user can save the named procedure/parameters in a memory cell, of which a representative few are shown at 410 of FIG. 4. The user can change the welding system by selecting the memory procedure and making such saved memory procedure the current procedure on the welding system through communication with the welding system via a remote component and/or via the user interface display, which may also include, for example, a PDA integral with the user interface display at the welding system.

It is contemplated that selection of parameters, values, user limits, memory location, name, etc. can be performed on a remote system, such as a PDA, computer, or the like and the information communicated to a welding system via a cable or wireless communication, or any other conventional method, such as an infrared data channel or the like. It is also appreciated that the selection can be performed directly at the welding unit utilizing the user interface display of the welding system.

The user can assign a user-defined name to the selected subset of procedures and/or parameters using alpha, numeric, or alpha-numeric characters or any readable text format. It is to be understood that the naming convention can be in English or any other language, provided the system has the capacity to display, process, etc. such language format. The arbitrary naming is limited only by the design of the user interface of the welding system. For example, a user interface panel may provide a limited number of characters, such as 16, or it may have an unlimited number of viewable characters. If a special name is not assigned to a given memory slot, the default procedure name is shown or some other naming convention. If a special name is assigned, it can override the existing name and the new name can be displayed in place of the default or existing name.

According to another aspect, the system may prompt a user if the same subset of parameters and/or procedures are selected to be saved under a different name and/or memory cell or slot. An alert or prompt is sent to the user requesting a determination if the same naming convention/memory should be used, such as prompting the user to select "yes" or "no" for example. A "no" response can abort the current selection, and a "yes" response can indicate the user wants to continue with the selected naming convention/memory. This eliminates redundancy and saves memory resources. Additionally and/or alternatively, if a user selects a name for a subset of parameters and then forgets the saved name, a user interface, such as a PDA, for example, can provide the user information concerning what the procedure relates to. This can be established by scrolling through or accessing each saved procedures or by allowing the user to enter search criteria and performing a search for the desired procedures. Each parameter shown in FIG. 4 may be optionally displayed on the user interface display of the welding system. Additionally and/or alternatively, the additional information can be stored on a PDA or personal computer, for example, which allows viewing of a wide range of information.

The system can also infer actions based on operator/user actions in the past using an artificial intelligence component. For example, if a saved procedure/parameter is selected and the operator/user makes changes to that procedure, the system can infer, based on the past actions of the operator that the saved procedure should be changed and can prompt, through the modification component 130, if such changes are desired to the saved procedure. An affirmative answer to the prompt allows the system to autonomously add and/or modify the saved procedure.

Figure 6:
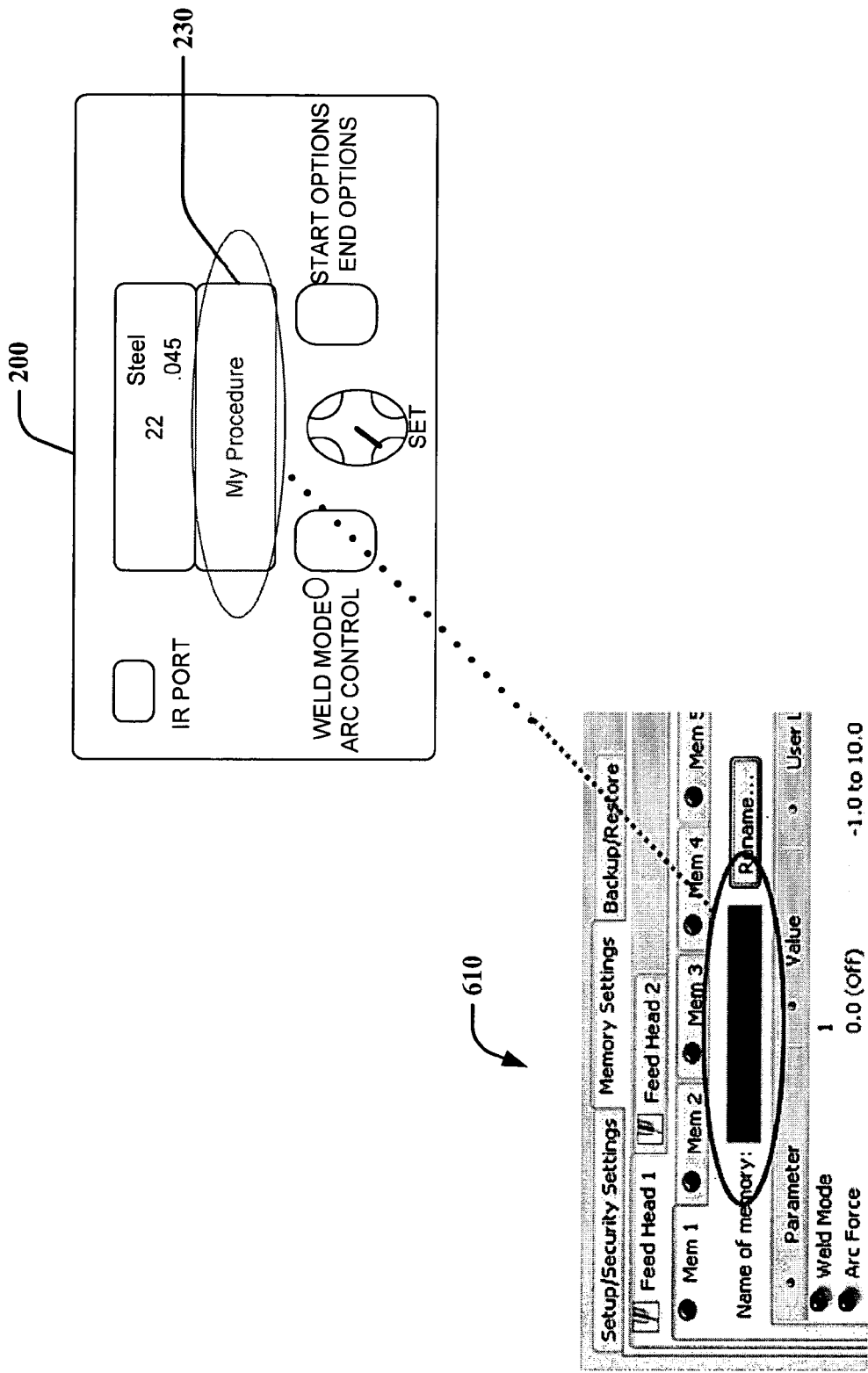
FIG. 6 illustrates a system for comprehensive identification and designation of welding procedures utilizing a personal computer according to an aspect of the invention.
Figure 7:
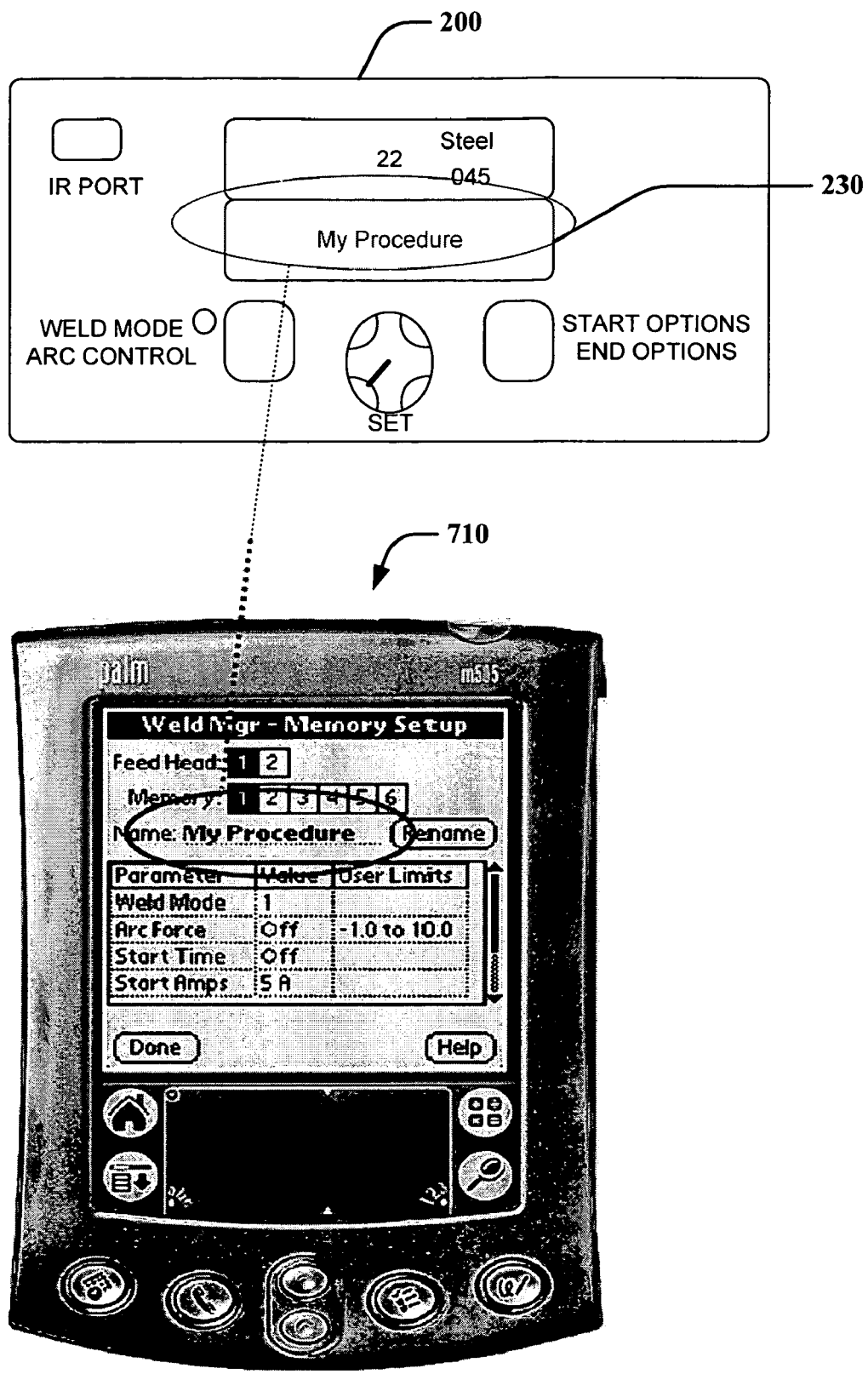
FIG. 7 illustrates a system for comprehensive identification and designation of welding procedures utilizing a PDA according to an aspect of the invention.

FIGS. 6 and 7 illustrate systems of comprehensive identification and designation of welding procedures utilizing remote components such as a personal computer 610 and a PDA 710 according to an aspect of the invention. It is to be understood that PDA, as used herein, is intended to include any mobile hand-held device that provides computing and information storage/retrieval capabilities including, for example, a smart phone and the like. Through utilization of the modification component 130, the user can remotely save the designated naming convention and the subset of parameters and/or procedures directly to the welding system where it is displayed on the user interface panel 200. While a PDA and a personal computer are shown, it is to be understood that the invention is not so limited and any device that allows user interaction can be utilized.

Figure 8:
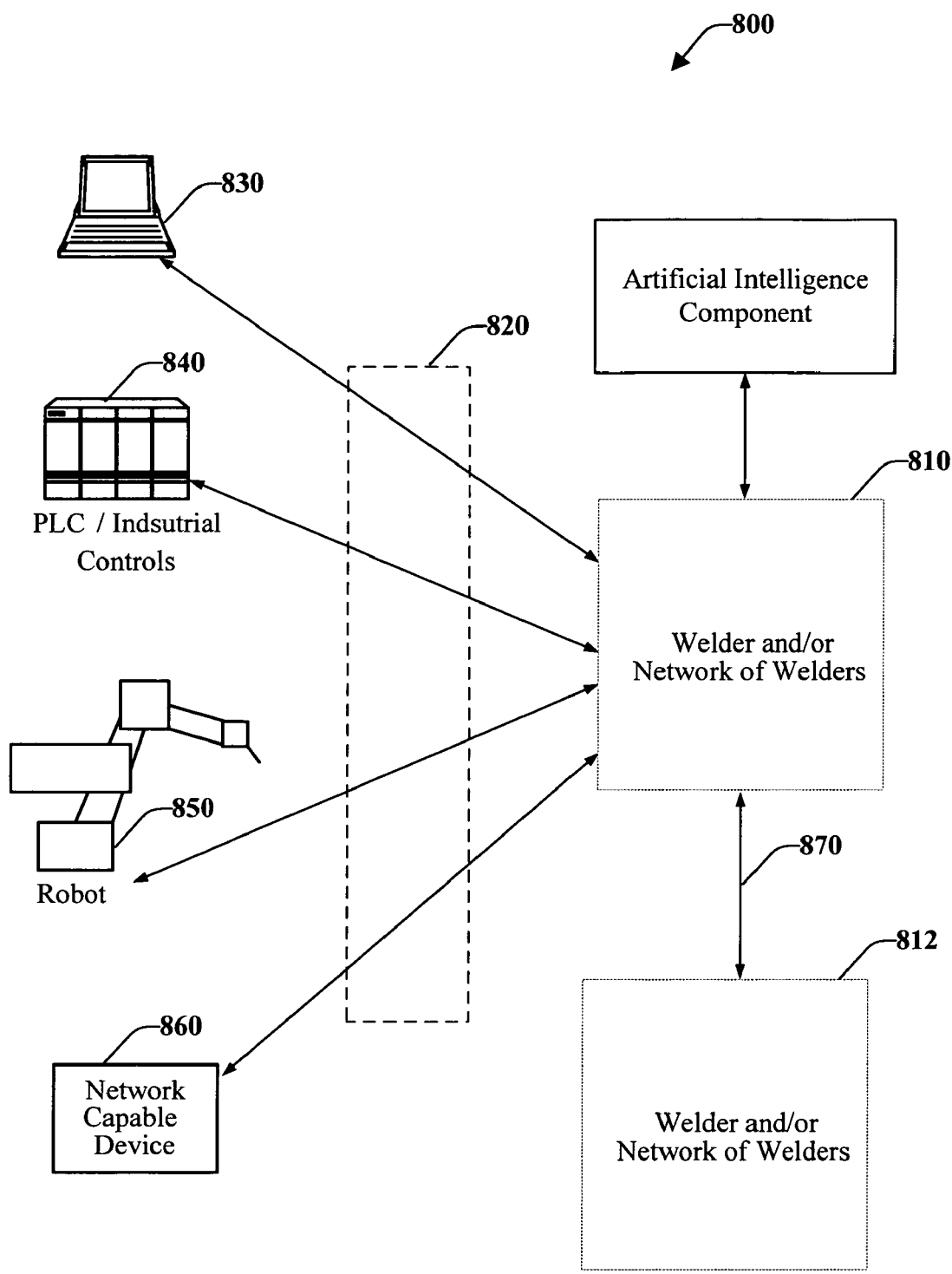
FIG. 8 illustrates an exemplary network configuration in accordance with the invention.

Referring now to FIG. 8, a system 800 illustrates an exemplary network configuration in accordance with the subject invention. The system 800 includes one or more welders 810 and 812 adapted with a network server and interface. It is noted that the welders 810 and 812 may also be included within a network of welders. Each welder 810 or 812 may communicate over the network 820 to a plurality of network enabled devices to facilitate selection of a subset of modes and/or associated naming convention. These devices may include a remote computer 830, an industrial controller 840, such as a programmable logic controller, a robot 850 and/or other network capable device 860 (e.g., TCP device, PDA device). In accordance with the invention, the network enabled devices 830-860 may open one or more welding protocol sockets (not shown) or network sockets and execute components or objects, such as an applet, to facilitate direct and timely access to the welders 810 and 812.

Each welder 810 and 812 may include program components to control and/or monitor the welders and can utilize a plurality of welding protocol sockets to communicate with the program components and the network enabled devices 830-860. The welding protocol sockets can facilitate communications between welders wherein one welder acts as a client and another welder acts as a server or vice versa and is illustrated as an operative connection 870. As depicted by the system 800, welders 810 and 812 may be integrated in an overall distributed architecture of plant floor control. This enables the welding process as well as other processes such as the robot 850 and industrial controller 840 to be monitored and controlled from one or more remote locations without sending systems engineers or operators to each process station to modify or diagnose the operating conditions of the welders.

In accordance with another aspect the subject invention (e.g., in connection with selection of a subset of welding parameters) can employ various AI-based schemes for carrying out various aspects thereof. An artificial intelligence component 880 can interface with the welders 810 and 812 and/or the network enabled devices 830-860 to facilitate comprehensive identification and designation of welding procedures. For example, a process for determining when a particular welding configuration is desired for a particular application can be facilitated via an automatic classifier system and process. Moreover, where welding system(s) are distributed over several locations and/or areas, and each location has substantially similar welding parameters and/or modes that represents the various welding procedures utilized at each location, the classifier can be employed to determine which welding system(s) should be configured with a particular welding parameter, naming convention and/or memory.

A classifier is a function that maps an input attribute vector, $x=(x1, x2, x3, x4, xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that a user desires to be automatically performed. In the case of welding systems, for example, attributes can be welding modes, parameters, and associated subset of modes, or other data-specific attributes derived from the manufacturer and/or user and the classes are categories or areas of interest (e.g., values, limits, memory locations).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when a subset of welding modes and associated naming convention is generated, when it is regenerated (i.e., updated), which memory location of a welding system is to be regenerated, etc.

Figure 9:
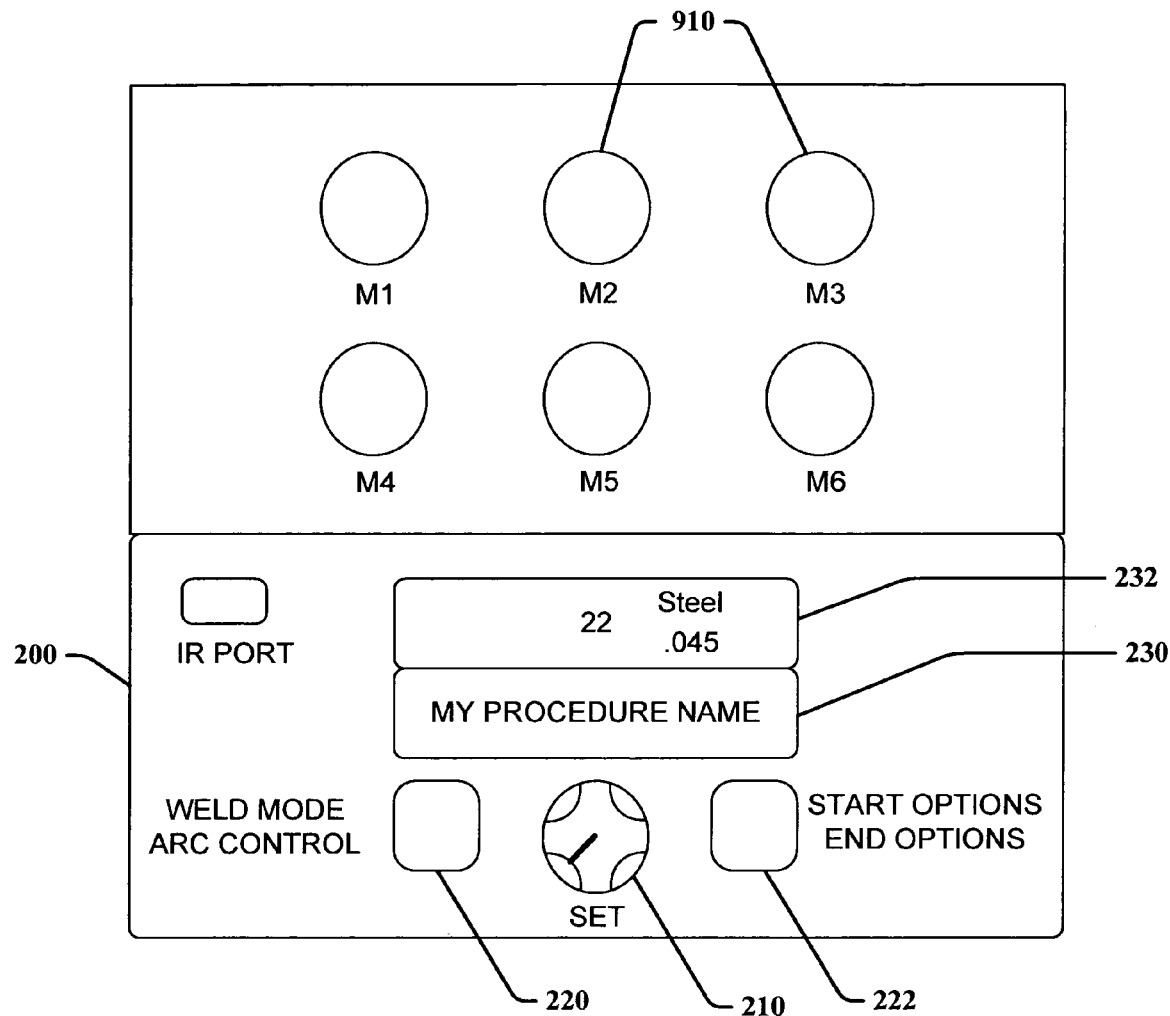
FIG. 9 illustrates an exemplary user interface panel having selectable memory in accordance with an aspect of the invention.

FIG. 9 illustrates an exemplary user interface panel having selectable memory in accordance with an aspect of the invention. The user interface panel 200 is the same as that illustrated in FIG. 2 with the addition of memory selectors 910. While only six memory locations 910 are shown, it is appreciated that less or more memory selections can be used in accordance with the invention. The operator can select a memory and/or storage location for retaining a subset of selected welding parameters and associated name via the user interface panel 200 and/or a remote component, as described above. For example, the user can select a desired procedure such as by the dial 210. The selected name appears in the user interface display 230 "My Procedure Name." The user can select the desired memory location, via the user interface display and/or remote component. By way of illustration and not limitation the user may select the desired memory location "M3" by setting the named procedure in the display window 230 and then pressing and holding the memory pushbutton "M3" for a set number of seconds, such as 3 seconds, for example. The holding of the pushbutton "M3" places such selected procedure/parameter in the memory location. Thus, when "M3" is selected it will automatically change the operating procedure of the welding system to the saved procedure "My Procedure Name." It is appreciated that the selection may be programmed into the memory location though other processes and/or techniques and is not limited by the above illustration. For example, the memory location can be selected by rotating a knob rather than pressing a pushbutton, and/or through an interactive user configuration tool, a PDA, a personal component, or other communication devices.

The operator can scroll though the procedures associated with the welding system and store, copy and/or tag that particular procedure with a particular memory location and/or rename the procedure. This provides easy access to procedures at the operator level. The memory location is basically a pointer to allow the saved procedure to be accessed. There may also be a prompt or other confirmation component that mitigates the possibility of an unwanted welding procedure changed and/or saved in a particular memory slot by requesting the user to confirm the change.

According to another aspect, the system can provide a masking procedure wherein an operator has only certain procedures and/or subset of procedures for which such operator can be exposed for security and/or safety issues. For example, the operator authenticates himself with a machine and memory by, for example, a username, and/or password. Once logged on that operator may be authorized to view and/or select needed memory/naming convention(s), which are predefined and available to that operator. The system can also lock out or disable the operator's ability to pick certain modes in the system.

Figure 10:
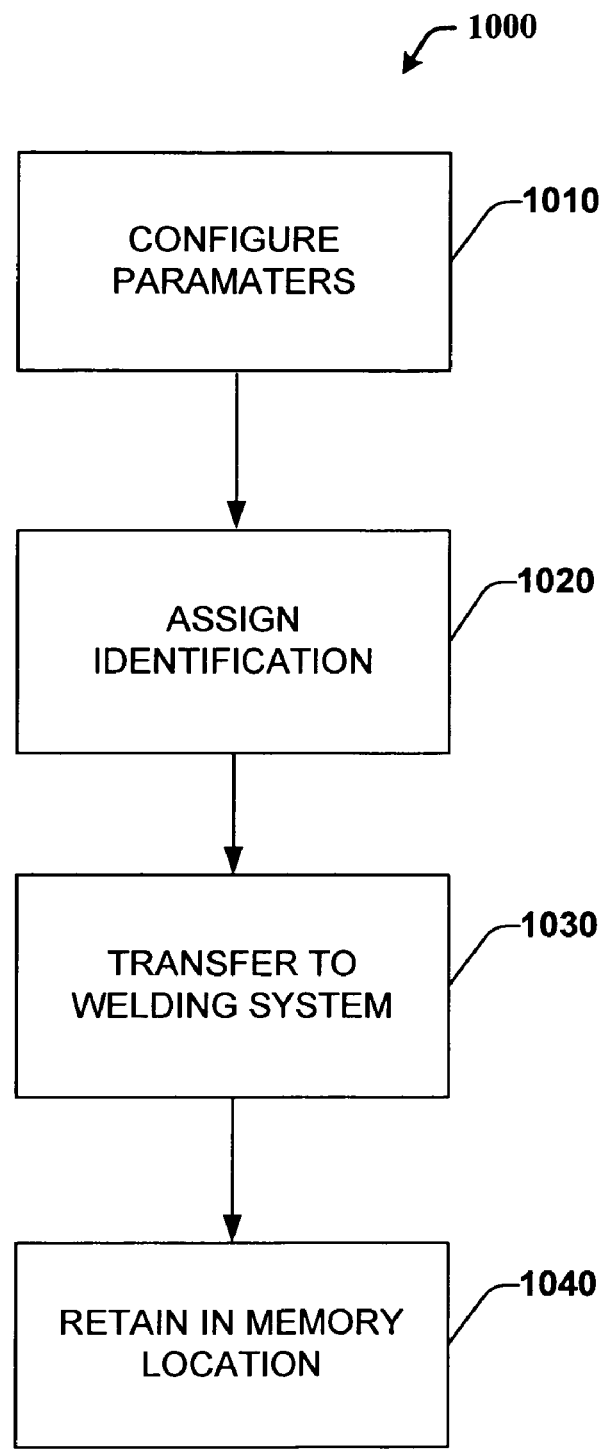
FIG. 10 is a methodology for comprehensive identification and designation of welding procedures according to an aspect of the invention.

With reference now to FIG. 10, illustrated is a methodology 1000 for comprehensive identification and designation of welding procedures. The method comprises a group of actions or processes represented by blocks. While, for purposes of simplicity of explanation, the methodology is shown and described as a series of blocks, it is to be understood and appreciated that the invention is not limited by the number or order of blocks, as some blocks may, in accordance with the invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be needed to implement a methodology in accordance with the invention.

The methodology starts at 1010 with configuration of welding parameters and/or procedures that are a subset of procedures supplied by the welding manufacturer. The configuration of the subset of parameters can be performed utilizing a computer system, a remote component such as a PDA, desk-top computer, laptop computer, personal computer, or the like, or may be configured at the display of the welding unit itself. Additionally, set points and/or limits can be specified with respect to the respective procedures though a series of prompts.

At 1020, a naming convention is assigned to the subset of selected procedures and/or parameters. This naming convention can override any naming convention preset at the factory, later modified and/or downloaded, such as from the manufacturer's website. At 1030, the naming convention and subset of parameters and/or procedures are communicated to the welding system via wireless technology, a direct connection using cable, and/or transferable media, such as DVD, floppy disk, or the like. At 1040, the naming convention and subset of parameters and/or procedures is retained in a memory location. Additionally and/or alternatively, the selection of memory location may occur on a remote computer.

Figure 11:
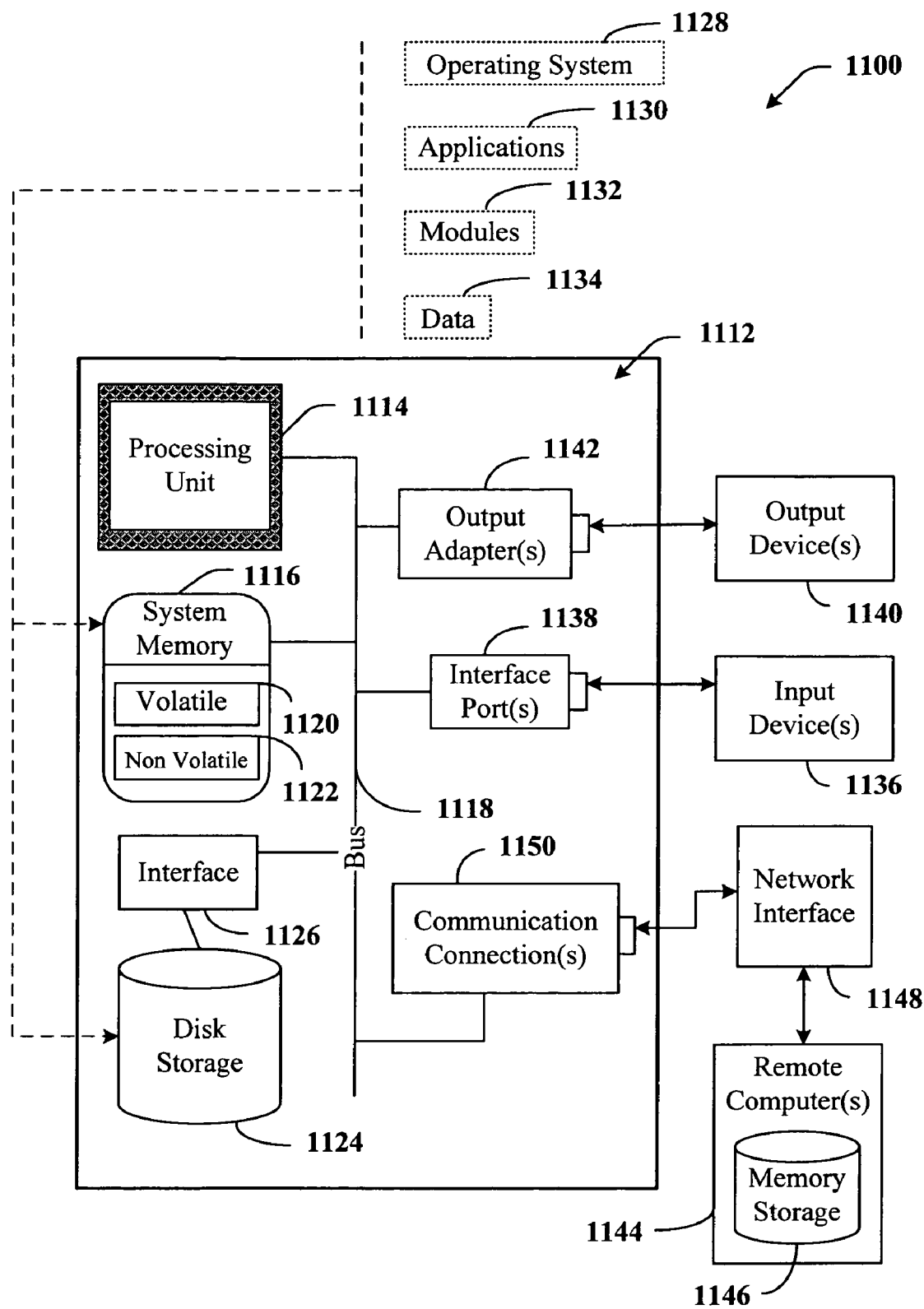
FIG. 11 is an exemplary computing environment that can be utilized in connection with the subject invention.

With reference to FIG. 11, an exemplary environment 1100 for implementing various aspects of the invention includes a computer 1112. The computer 1112 includes a processing unit 2114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 944.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
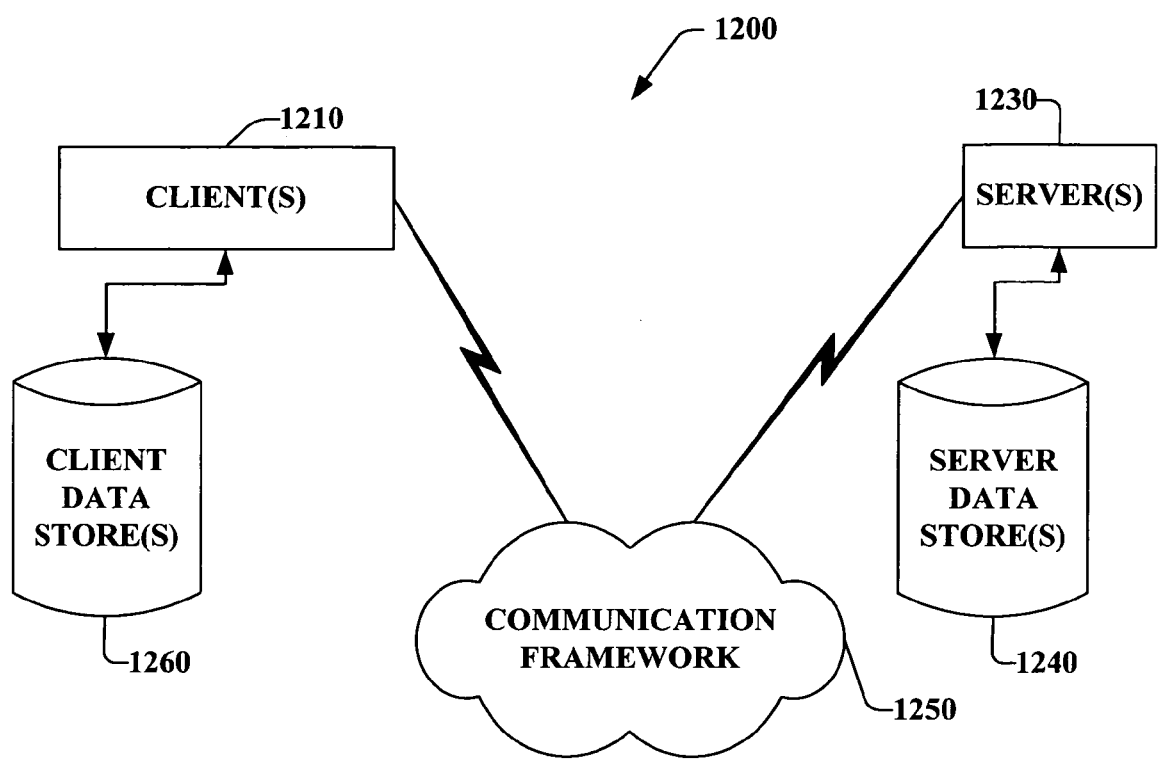
FIG. 12 is an exemplary operating environment that can be employed in connection with the subject invention.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1000 includes a communication framework 1050 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the invention. It is, of course, not possible to describe every conceivable combination of components or methodologies for purposes of describing the invention, but one of ordinary skill in the art may recognize that many further combinations and permutation of the invention are possible. Accordingly, the invention is intended to embrace all such alterations, modifications, and variations that fall within the spirit and scope of the appended claims. Furthermore, to the extent that the term "includes" is used in either the detailed description or in the claims, such term is intended to be inclusive in a manner similar to the term "comprising" as "comprising" is interpreted when employed as a transitional word in a claim.

What is claimed is:

1. A system, comprising:
    a welder, comprising:
        a storage component that stores a first welding procedure with a first manufacturer-defined default name and a second welding procedure with a second manufacturer-defined default name, wherein the first welding procedure and the second welding procedure comprise at least one parameter and at least one limit for the at least one parameter;
        a user interface component that renders at least one of the first manufacturer-defined default name and the first welding procedure or the second manufacturer-defined default name and the second welding procedure; and
        a modification component coupled to the user interface component that:
            receives an input comprising a user-defined name to replace at least one of the first manufacturer-defined default name or the second manufacturer-defined default name; and overrides at least one of the first manufacturer-defined default name or the second manufacturer-defined default name with the user-defined name; and an interactive configuration tool, at a remote location external to the welder, that renders at least the first manufacturer-defined default name and the second manufacturer-defined default name, receives a selection of the first manufacturer-defined default name or the second manufacturer-defined default name, receives an input comprising the user-defined name, and sends the user-defined name to the modification component, wherein the user interface component renders at least the user-defined name and at least one of the first welding procedure or the second welding procedure.

2. The system of claim 1, wherein the user interface component comprises an information gathering component that employs the interactive configuration tool to analyze a setup of the welding system and to determine information needed to configure the at least one of the first welding procedure or the second welding procedure.

3. The system of claim 2, wherein the interactive configuration tool queries a user for the information needed to configure the at least one of the first welding procedure or the second welding procedure.

4. The system of claim 3, wherein the interactive configuration tool defines the at least one limit for the at least one parameter.

5. The system of claim 4, wherein the at least one limit for the at least one parameter includes at least a high limit value and a low limit value.

6. The system of claim 4, wherein the interactive configuration tool monitors a health of the welding system through system diagnostics.

7. The system of claim 1, wherein the storage component controls access to the at least the first welding procedure or the second welding procedure.

8. The system of claim 1, the modification component further comprises a remote access component that facilitates connection of the interactive configuration tool to the welding device.

9. The system of claim 1, wherein the interactive configuration tool is a personal computer.

10. The system of claim 1, wherein the interactive configuration tool is a mobile computing device.

11. A system, comprising:

a storage component, associated with a welder, that stores a first welding procedure with a first manufacturer-defined default name and a second welding procedure with a second manufacturer-defined default name, wherein the first welding procedure and the second welding procedure comprise at least one parameter and at least one limit for the at least one parameter; and an interactive configuration tool, remote to the welder, that renders at least the first manufacturer-defined default name and the second manufacturer-defined default name, receives a selection of the first manufacturer-defined default name or the second manufacturer-defined default name, receives an input comprising at least a user-defined name to replace the first manufacturer-defined name or the second manufacturer-defined name, configures the at least one parameter and the at least one limit for the at least one parameter of at least one of the first welding procedure or the second welding procedure and overrides at least one of the first manufacturer-defined default name or the second manufacturer-defined default name with the user-defined name.

12. The system of claim 11, wherein the interactive configuration tool receives an input value for the at least one limit for the at least one parameter.

13. The system of claim 11, wherein the interactive configuration tool receives input values for a maximum limit and a minimum limit for the at least one parameter.

14. The system of claim 11, further comprising an interface component, associated with the welder, that displays the user-defined name, the at least one welding parameter and the at least one limit for the at least one welding parameter.

\* \* \* \* \*

UNITED STATES PATENT AND TRADEMARK OFFICE
CERTIFICATE OF CORRECTION

| | | |
|---|---|---|
| PATENT NO. | : 8,115,138 B2 | Page 1 of 1 |
| APPLICATION NO. | : 11/143208 | |
| DATED | : February 14, 2012 | |
| INVENTOR(S) | : Ronald Robert Jacovetty et al. | |

It is certified that error appears in the above-identified patent and that said Letters Patent is hereby corrected as shown below:

Column 12, line 32, please replace "2114" with -- 1114 --

Signed and Sealed this
Twenty-second Day of May, 2012

David J. Kappos
*Director of the United States Patent and Trademark Office*